(12) United States Patent
Perttunen

(10) Patent No.: US 6,563,521 B1
(45) Date of Patent: May 13, 2003

(54) METHOD, ARTICLE AND APPARATUS FOR ORGANIZING INFORMATION

(76) Inventor: Cary D. Perttunen, 11764 Raintree Ct., Shelby Township, MI (US) 48315

(*) Notice: Subject to any disclaimer, the term of this patent is extended or adjusted under 35 U.S.C. 154(b) by 359 days.

(21) Appl. No.: 09/594,058

(22) Filed: Jun. 14, 2000

(51) Int. Cl.$^7$ ................................. G09G 5/00
(52) U.S. Cl. .............. 345/854; 345/764; 345/853; 345/855; 345/713; 345/803; 707/203
(58) Field of Search ................ 345/764, 853, 345/854, 855, 711, 712, 713, 802, 803, 804; 707/3, 5, 203

(56) References Cited

U.S. PATENT DOCUMENTS

| | | | |
|---|---|---|---|
| 5,515,488 A | * 5/1996 | Hoppe et al. | 345/440 |
| 5,596,699 A | 1/1997 | Driskell | |
| 5,675,733 A | 10/1997 | Williams | |
| 5,768,423 A | * 6/1998 | Aref et al. | 382/228 |
| 5,798,760 A | 8/1998 | Vayda et al. | |
| 5,805,167 A | 9/1998 | van Cruyningen | |
| 5,926,180 A | 7/1999 | Shimamura | |
| 5,943,039 A | 8/1999 | Anderson et al. | |
| 5,987,469 A | 11/1999 | Lewis et al. | |
| 6,014,678 A | * 1/2000 | Inoue et al. | 707/501.1 |
| 6,104,400 A | 8/2000 | Halachmi et al. | |
| 6,144,962 A | 11/2000 | Weinberg et al. | |
| 6,145,000 A | 11/2000 | Stuckman et al. | |
| 6,285,367 B1 | 9/2001 | Abrams et al. | |
| 6,286,002 B1 | * 9/2001 | Axaopoulos et al. | 707/10 |
| 6,297,824 B1 | * 10/2001 | Hearst et al. | 345/848 |
| 6,314,434 B1 | * 11/2001 | Shigemi et al. | 707/203 |
| 6,359,635 B1 | 3/2002 | Perttunen | |
| 6,369,819 B1 | 4/2002 | Pitkow et al. | |
| 6,377,287 B1 | 4/2002 | Hao et al. | |
| 6,385,602 B1 | * 5/2002 | Tso et al. | 707/3 |
| 6,426,761 B1 | 7/2002 | Kanevsky et al. | |
| 6,442,544 B1 | * 8/2002 | Kohli | 707/5 |
| 6,448,987 B1 | 9/2002 | Easty et al. | |
| 2002/0122072 A1 | 9/2002 | Selker | |

OTHER PUBLICATIONS

Johnson et al., Applied Multivariate Statistical Analysis, 1982, pp. 532–573, Prentice–Hall, Englewood Cliffs.

Tucker, Applied Combinatorics, Second Edition, 1984, pp. 28–31 and 80–131, John Wiley & Sons, New York.

Luger et al., Artificial Intelligence and the Design of Expert Systems, 1989, pp. 88–99, Benjamin/Cummings Publishing, Redwood City.

CRC Standard Mathematical Tables and Formulae, 29$^{th}$ Edition, 1991, pp. 106–107, CRC Press, Boca Raton.

American Heritage Dictionary of the English Language, Third Edition, 1992, inside back cover, Houghton Mifflin, Boston.

"The best chart type for my data," help screen from Microsoft Excel for Windows 95, 1995.

Using Visio Products, 1997, pp. 119–122, 185–202 and 207–232, Visio Corporation, Seattle.

Hyman, Dynamic HTML for Dummies, 1997, pp. 63–79, IDG Books, Foster City.

Lehto et al., Official Microsoft FrontPage 98 Book, 1997, pp. 32–52, Microsoft Press, Redmond.

Tittel et al., HTML 4 for Dummies, 1998, pp. 12–13 and 283–293, IDG Books, Foster City.

(List continued on next page.)

*Primary Examiner*—John Cabeca
*Assistant Examiner*—Cuong T. Thai

(57) ABSTRACT

Items related by a tree are further organized by determining a depth-first search of the tree having an optimum value associated therewith. The associated value of a depth-first search is based upon an order of considering items in the tree, and similarity values between pairs of items in the tree.

39 Claims, 5 Drawing Sheets

OTHER PUBLICATIONS

"Aurigin Announces General Availability of Version 6.0 of its Intellectual Property Asset Management System," Web page from Aurigin Systems, Oct. 1998.

"The Brain," Web page from PC Magazine Online, Apr. 1998.

"Roland Introduces HPD–15 HandSonic Hand Percussion Pad", Feb. 3, 2000, Roland Corporation U.S., Los Angeles.

"HPD–15 HandSonic", printed from the Internet on Jan. 3, 2001, http://209.144.99.11/PRODUCTS/hardware/hpd15.htm.

* cited by examiner

METHOD, ARTICLE AND APPARATUS FOR ORGANIZING INFORMATION

RELATED APPLICATIONS

The present application is related to the application entitled "METHODS, ARTICLES AND APPARATUS FOR VISIBLY REPRESENTING INFORMATION AND FOR PROVIDING AN INPUT INTERFACE", having Ser. No. 09/243,595, filed Feb. 3, 1999, whose disclosure is hereby incorporated by reference into the disclosure of the present application, and the application entitled "BROWSING METHODS, ARTICLES AND APPARATUS", having Ser. No. 09/533,545, filed Mar. 23, 2000, whose disclosure is hereby incorporated by reference into the disclosure of the present application.

TECHNICAL FIELD

The present invention relates to methods, articles and apparatus for organizing information.

BACKGROUND OF THE INVENTION

Many Internet portals provide a search engine with which a user may initiate an Internet search. The search engine returns a list of Web pages based upon a search expression received from the user.

Some search engines display a similarity value for each Web page in the list. Each similarity value numerically indicates a degree of correlation or relevance between its corresponding Web page and the search expression.

Oftentimes, the Web pages in the list are sorted based on the similarity values. By sorting the Web pages in this manner, the list presents highly-relevant Web pages before lesser-relevant Web pages.

Some Internet portals provide directories of Web pages. These directories provide a tree-like structure of categories and subcategories within which Web pages are classified.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF PREFERRED EMBODIMENTS

Improved methods, articles and apparatus for organizing information are disclosed herein. Items related by a tree are further organized by determining a depth-first search of the tree having an optimum value associated therewith. The associated value of a depth-first search is based upon an order of considering items in the tree, and similarity values between pairs of items in the tree.

Figure 1:
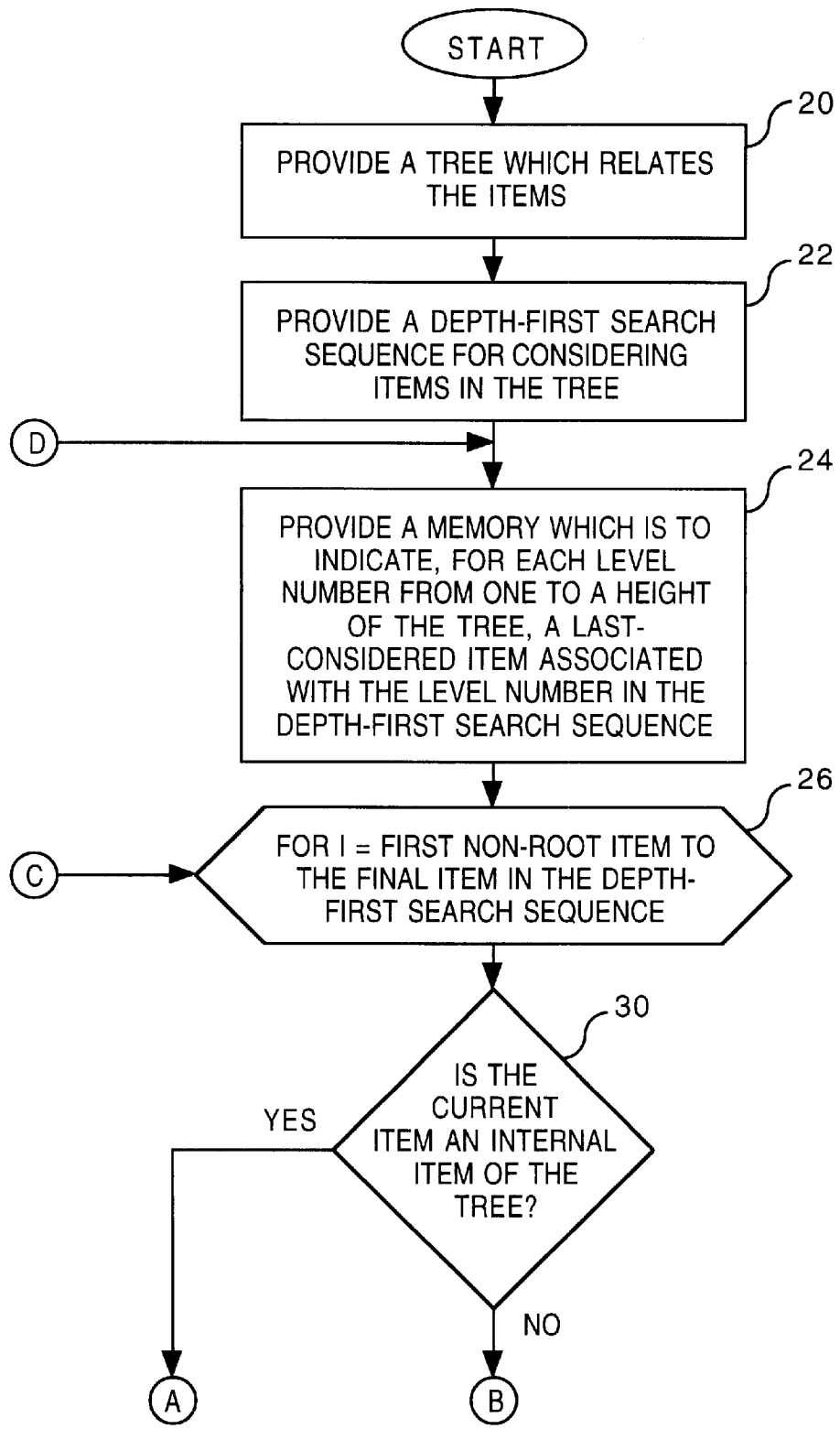
FIGS. 1, 2(A–B) and 3 provide a flow chart of an embodiment of a method of organizing item information.
Figure 2A:
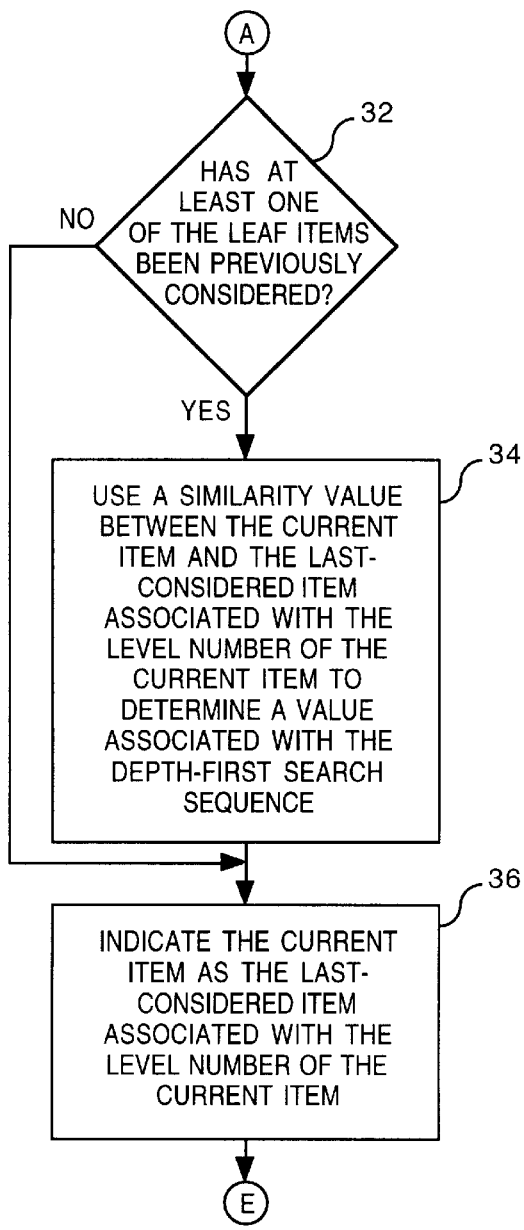
Figure 2B:
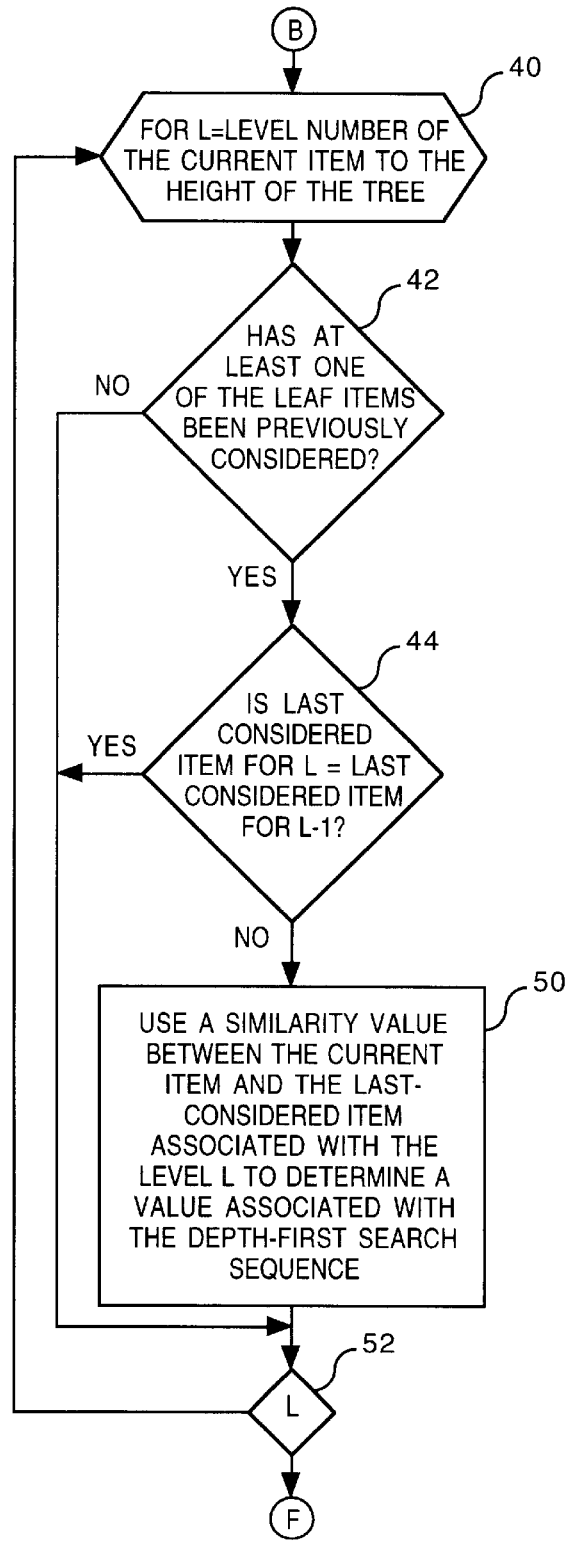
Figure 3:
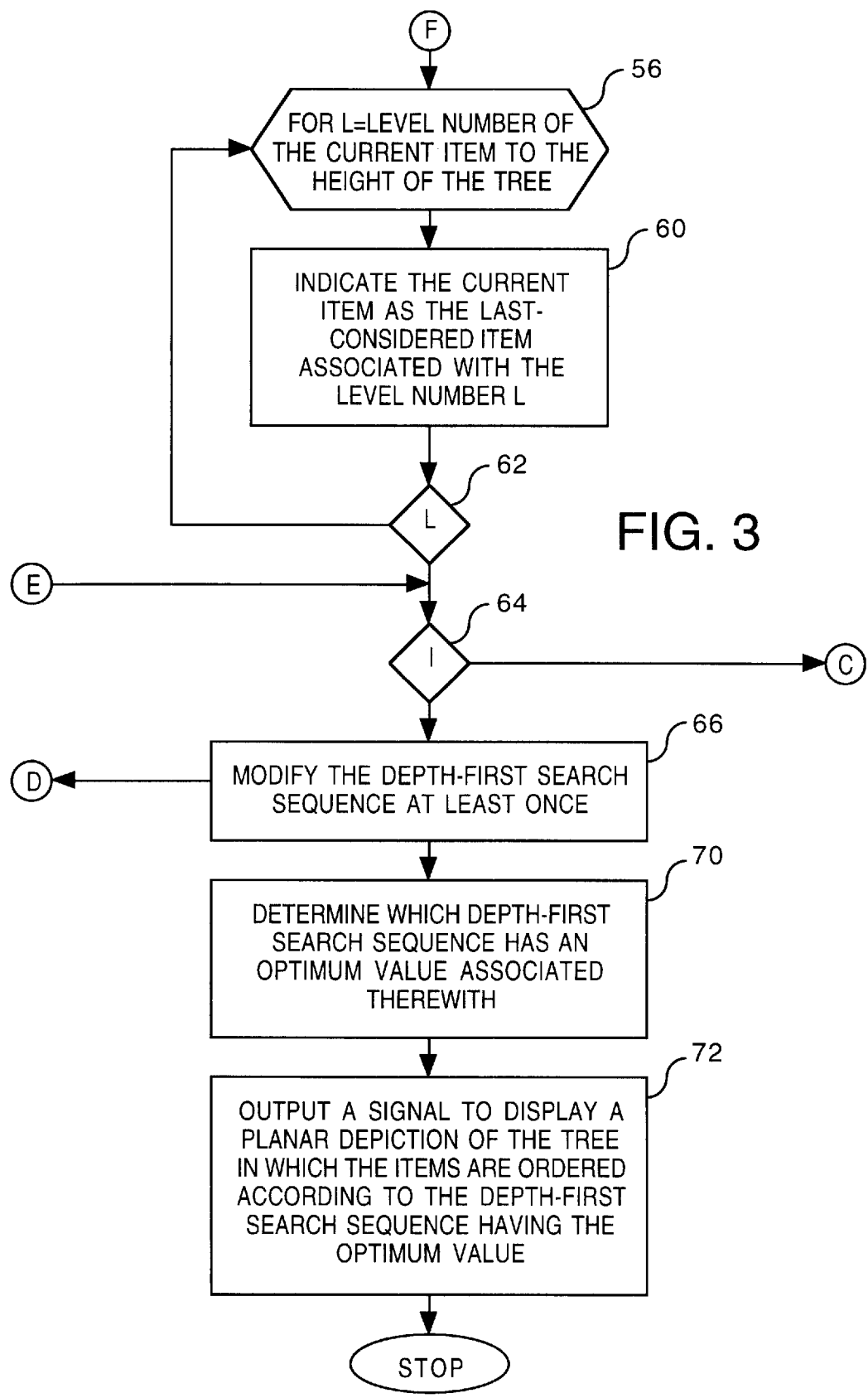

FIGS. 1, 2 and 3 provide a flow chart of an embodiment of a method of organizing item information. As indicated by block 20, the method comprises providing a tree which relates a plurality of items. Various computer-readable data structures can be used to represent the tree in a computer-readable form using a computer-readable medium.

Examples of an item include, but are not limited to a computer address, a computer site, a Web page, audio content, an image, computer software, an information category, an information subcategory, an information source, a logical disk for a computer, a computer directory, a computer-readable file, computer-readable data, a computer-readable message, a computer-readable description and/or image of a physical object, a computer-readable description and/or image of a purchasable item, a general category, and a general subcategory. Of particular interest are computer-readable items in a markup language such as HTML (hypertext markup language), HDML (handheld device markup language), or WML (wireless markup language). Also of interest are computer-readable messages such as those from either USENET or a Web page which provides an on-line discussion forum.

Before proceeding, a review of trees and graph-related terminology is provided. A graph is definable by a set of nodes and a set of edges joining or associating different pairs of distinct nodes. The edges in the graph may be either directed or undirected.

Alternative terminology may be used to describe the graph. Examples of synonyms of "node" include, but are not limited to, "vertex" and "state". Examples of synonyms of "edge" include, but are not limited to, "arc" and "link". Therefore, the herein-disclosed methods, articles, apparatus, and examples should not be limited by the selected terminology used to describe the graph.

A first node is said to be adjacent to a second node if there is an edge from the first node to the second node. A path is definable by a sequence of nodes wherein each consecutive pair of nodes in the sequence is adjacent.

A tree is a graph having a unique path from a designated node, called a root node, to each of its other nodes. If the tree is undirected, then any of its nodes can be designated to be the root node. An undirected tree can be made into a directed tree by directing all edges away from the designated root node.

Each node in a directed tree, except for the root node, is a child node of a unique parent node from which an edge is directed thereto. Nodes having the same parent node are called siblings. Nodes of a directed tree with no children are called leaf nodes. Nodes having at least one child are called internal nodes. The level number of a node is defined as the number of edges in the path between the node and the root node. The height of the tree is the largest level number of any node.

If each internal node of a rooted tree has m children, the tree is called an m-ary tree. If m=1, the tree is unary. If m=2, the tree is binary. If m=3, the tree is ternary.

Referring back to block 20, each of the items is represented by a corresponding node of the tree. Relationships between items are represented by edges in the tree. Examples of edge-represented relationships between items include, but are not limited to, a degree of similarity, a hyperlink, an associative link, a state of being an element of, a state of being contained in, a state of being associated with, a state of reporting to, a state of being in a category, a state of depending from, and a state of being a reply to.

It is preferred that the tree is non-unary. By being non-unary, the tree has at least one internal node with two or more child nodes. It is also preferred that the tree has a height of at least two. It is further preferred that the tree has more leaf nodes than a number of child nodes emanating from its root node.

Optionally, the tree is provided based upon a search. It should be appreciated, however, that embodiments of the method may be performed absent the search.

A search expression may be user-entered using an input device such as a keyboard, a touch screen, a touch pad or a voice input device. The search expression may contain one or more words in the form of either a Boolean search expression or a natural language search expression, for example. The search expression may include information from a plurality of user-enterable fields to limit the scope of the search. The search expression may include an image or encoded audio.

A search is performed based on the search expression. The search yields search results comprising a plurality of items, the plurality of items being a subset of a larger set of items.

A first plurality of similarity values between the search expression and the plurality of items are determined. Each of the first plurality of similarity values indicates a degree of similarity, relevance or correlation between the search expression and a corresponding one of the items of the subset.

A second plurality of similarity values between a corresponding plurality of pairs of the items are determined. Each of the second plurality of similarity values indicates a degree of similarity, relevance or correlation between a corresponding pair of items of the subset.

The tree may be provided by determining an optimum path tree based upon the first plurality of similarity values and the second plurality of similarity values. The optimum path tree indicates a respective optimum path between the search expression and each of the plurality of items.

The optimum path between the search expression and an item has an optimum function value of similarity values between the search expression and the item. Examples of the function whose optimum value dictates the optimum path include, but are not limited to, a sum of similarity values between the search expression and the item, and a product of similarity values between the search expression and the item. To determine an optimum product of similarity values, an additive optimum path algorithm may be performed on a logarithm of the similarity values. For example, if the similarity values are numerical values between 0% and 100%, then an additive minimum path algorithm may be performed on a negative logarithm of the non-zero similarity values, e.g. –log(similarity value), to determine a maximum product of similarity values.

As is known in the art of network algorithms, examples of algorithms to compute the shortest paths include, but are not limited to, Dijkstra's algorithm and Floyd's algorithm. Those having ordinary skill can review shortest path algorithms on pp. 123–127 of A. Tucker, *Applied Combinatorics*, Second Edition, John Wiley & Sons, 1984, which is hereby incorporated by reference into this disclosure.

Alternatively, the tree may be provided by determining a spanning tree based upon the first plurality of similarity values and the second plurality of similarity values. Examples of the spanning tree include, but are not limited to, an optimum spanning tree such as a minimum spanning tree, and a search tree.

The optimum spanning tree has an optimum function value of similarity values. Examples of the function whose optimum value dictates the optimum spanning tree include, but are not limited to, a sum of similarity values, and a product of similarity values. To determine an optimum product of similarity values, an additive optimum spanning tree algorithm may be performed on a logarithm of the similarity values.

As is known in the art of network algorithms, examples of algorithms to compute a minimum spanning tree include, but are not limited to, Kruskal's algorithm and Prim's algorithm. Those having ordinary skill can review minimum spanning trees on pp. 127–131 of A. Tucker, *Applied Combinatorics*, Second Edition, John Wiley & Sons, 1984, which is hereby incorporated by reference into this disclosure.

Examples of the search tree include, but are not limited to, a depth-first search spanning tree, a breadth-first search spanning tree, or a best-first search spanning tree. Those having ordinary skill can review search trees on pp. 80–122 of A. Tucker, *Applied Combinatorics*, Second Edition, John Wiley & Sons, 1984, which is hereby incorporated by reference into this disclosure.

For computer-readable messages, an edge in the tree may indicate that one message is a reply to another message. Thus, a reply message is a child of its parent message, and two reply messages to the same parent message are siblings.

Each base message, i.e. each message that begins a new thread, may have an associated edge to a root node in the tree. If a search is performed, the root node may represent the search expression. Regardless of whether a search is performed, the root node may represent a discussion group of which the messages are elements.

As indicated by block 22, the method comprises providing a depth-first search sequence for considering items in the tree. An initial depth-first search sequence may be provided by initializing, for each of the internal items having at least two child items in the tree, a respective sequence for considering its respective child items.

As indicated by block 24, the method comprises providing a memory which is to indicate, for each level number from one to a height of the tree, a last-considered item associated with the level number in the depth-first search sequence. The memory may be initialized to indicate that no items have been considered at each level number from one to the height of the tree.

As indicated by block 26, the method comprises considering a first non-root item in the depth-first search sequence as a current item. As indicated by block 30, the method comprises determining if the current item is an internal item of the tree. If the current item is an internal item of the tree, an act of determining if at least one of the leaf items had been previously considered in the depth-first search sequence is performed (block 32).

If at least one of the leaf items had been previously considered in the depth-first search sequence, a similarity value between the current item and the last-considered item associated with the level number of the current item is used to determine a value associated with the depth-first search sequence (block 34). As indicated by block 36, the current item is indicated as the last-considered item associated with the level number of the current item.

Referring back to block 30, if the current item is not an internal item of the tree, and thus is a leaf item of the tree, a subprocess is performed for each level number L from the level number of the current item to the height of the tree (block 40). The subprocess comprises determining if at least one of the leaf items had been previously considered in the depth-first search sequence (block 42) and determining if the last-considered item associated with level number L is the same as the last-considered item associated with level number L-1 (block 44). Since the root item is always the last-considered item associated with level number 0, the last-considered item associated with level number 1 always differs from the last-considered item associated with level number 0. Thus, block 44 may be skipped for L=1.

If at least one of the leaf items has been previously considered in the depth-first search sequence and the last-considered item associated with level number L differs from the last-considered item associated with level number L-1, a similarity value between the current item and the last-considered item associated with the level number L is used to determine a value associated with the depth-first search sequence (block 50). As indicated by block 52, the subprocess is performed one or more times for each level number indicated in block 40.

Each of the similarity values described with reference to blocks 34 and 50 indicates a degree of similarity, relevance or correlation between a corresponding pair of items. The similarity values described with reference to blocks 34 and 50 may be the same as the second plurality of similarity values used to determine the tree. Alternatively, the similarity values described with reference to blocks 34 and 50 may differ from the second plurality of similarity values used to determine the tree.

As indicated by block 56, a subprocess is performed for each level number L from the level number of the current item to the height of the tree. As indicated by block 60, the current item is indicated as the last-considered item associated with the level number L. As indicated by block 62, the subprocess is performed one or more times for each level number indicated in block 56.

As indicated by block 64, a subsequent item in the depth-first search sequence is considered as the current item. Flow of the method may be directed back to block 26 until no subsequent items exist in the depth-first search sequence. Optionally, block 26 may be modified to further iterate, after the final item, from the first non-root item to the first leaf item. In this case, items from the first non-root item to the first leaf item are considered twice.

The value associated with the depth-first search sequence is a function of the similarity values identified in blocks 34 and 50. For example, the function may be based on a sum of the aforementioned similarity values, a product of the aforementioned similarity values, an average of the aforementioned similarity values such as either an arithmetic mean or a geometric mean of the aforementioned similarity values, a maximum of the aforementioned similarity values, or a minimum of the aforementioned similarity values.

The function may be partially evaluated each time a similarity value is identified in blocks 34 and 50. Alternatively, the function may be evaluated after all of the similarity values have been identified in blocks 34 and 50 for all iterations of block 26. In general, the similarity values identified in blocks 34 and 50 may be used at any time to evaluate the function and thus determine the value associated with the depth-first search sequence.

As indicated by block 66, the depth-first search sequence is modified. The depth-first search sequence may be modified by modifying the sequence for considering child items for each of at least one of the internal items having at least two child items in the tree. Flow of the method is directed back to block 24 to initiate the process of determining a value associated with the modified depth-first search sequence. The memory provided for indicating last-considered items in the initial depth-first search sequence may be either different or the same as the memory provided for indicating last-considered items for the modified depth-first search sequence.

In this way, values associated with a plurality of depth-first search sequences of the tree are determined. Optionally, values associated with all possible depth-first search sequences of the tree may be determined. The number of possible depth-first search sequences of the tree is equal to the product of the factorial of each internal node's number of children nodes.

Using an embodiment of the herein-disclosed method for some functions, two depth-first search sequences have the same value associated therewith if one has an order of considering leaf items which is the reverse of the other. Thus, in these and other cases, values associated with at most half of all possible depth-first search sequences of the tree may be determined. The depth-first search sequences which are considered may be limited by prohibiting reverse-equivalent sequences for considering child items of the root item. A branch-and-bound approach, for example, may be used to limit consideration to less than half of all possible depth-first search sequences.

Using another embodiment of the herein-disclosed method for some functions, two depth-first search sequences have the same value associated therewith if one has an order of considering leaf items which is either a cyclic-equivalent or a reverse cyclic-equivalent of the other. For example, a sequence A-B-C-D has three cyclic-equivalent sequences B-C-D-A, C-D-A-B and D-A-B-C, and four reverse cyclic-equivalent sequences D-C-B-A, A-D-C-B, B-A-D-C and C-B-A-D. Thus, in these and other cases, values associated with at most $M/(2*N)$ sequences may be determined, where M is the number of all possible depth-first search sequences of the tree, and N is the number of child items of the root item. The depth-first search sequences which are considered may be limited by prohibiting cyclic-equivalent and reverse cyclic-equivalent sequences for considering child items of the root item. A branch-and-bound approach, for example, may be used to limit consideration to less than $M/(2*N)$ sequences.

As indicated by block 70, the method comprises determining which depth-first search sequence has an optimum value associated therewith. Depending on the function used to determine values associated with depth-first search sequence, this act may comprise either determining which depth-first search sequence has a maximum associated value, or determining which depth-first search sequence has a minimum associated value.

As indicated by block 72, a signal is outputted to display a planar depiction of the tree in which the items are ordered according to the depth-first search sequence having the optimum value. The planar depiction may comprise a plurality of regions to visibly represent the items, wherein adjacent items in the tree are represented by radially-adjacent regions, and wherein pairs of items identified in blocks 34 and 50 for the depth-first search sequence having the optimum value are represented by angularly-adjacent regions. The planar depiction may be determined in accordance with the teachings in the patent application having Ser. No. 09/243,595, which is incorporated by reference into the present disclosure.

The root item may be represented by a region having a shape at least partially defined by an outer arc. Each of the non-root, internal items may be represented by a corresponding region having a corresponding shape at least partially defined by a corresponding outer arc, a corresponding inner arc approximately equivalent to the corresponding outer arc of its parent in the tree, and a corresponding angular width approximately equal to a sum of each corresponding angular width of its at least one child in the tree. Each of the leaf items may be represented by a corresponding region having a corresponding shape at least partially defined by a corresponding outer arc, a corresponding inner arc approximately equivalent to the corresponding outer arc of its parent item in the tree, and a corresponding angular width approximately equal to the corresponding angular width of its parent item in the tree. If the depiction is to span an overall angular width of about 360 degrees, it is preferred that block 26 be modified to further iterate, after the final item, from the first non-root item to the first leaf item.

In these cases and other cases, the herein-disclosed method acts to determine an arrangement of a plurality of shapes which represent the non-root, internal items and the leaf items, which optimizes a function of similarity values between pairs of items represented by angularly-adjacent pairs of the shapes and has radially-adjacent pairs of the shapes representing adjacent pairs of the items in the tree.

Alternatively, the planar depiction may comprise a plurality of regions to visibly represent the items, wherein adjacent items in the tree are represented by a visible edge between their corresponding regions, and wherein child items are ordered (either left-to-right, right-to-left, top-to-bottom, bottom-to-top, clockwise or counterclockwise, for example) according to the sequence associated with the depth-first search sequence having the optimum value.

Examples of the signal include, but are not limited to, a display signal and a computer data signal. The display signal may be communicated either through a video cable or wirelessly to a display device. The display device displays the planar depiction based on the display signal. Examples of the display device include, but are not limited to, a computer monitor, a television, a liquid crystal display, a cathode ray tube, and a gas plasma display.

The computer data signal may be communicated via a computer network. Examples of the network include, but are not limited to, an internet, an intranet and an extranet. The computer data signal may include computer program code to assist in displaying the planar depiction. Of particular interest is the signal being representative of code in a markup language such as HTML, HDML or WML.

The computer data signal is received by a computer in communication with the computer network. The computer generates a display signal to display the planar depiction on the display device.

Each of the regions of the planar depiction may be user-selectable. In this case and other cases, the above-described method may be augmented to perform an act based on a selection of an item from the tree. The act may be performed in response to receiving a user action via an input device. The act may include, but is not limited to, any of the following examples. If the plurality of items are associated with purchasable items, the act may include: providing information for the particular purchasable item, and/or performing a transaction for the particular purchasable item. If the plurality of items include a plurality of computer addresses, the act may include linking to the particular computer address. If the plurality of items include a plurality of computer-readable files, the act may include opening the computer-readable file. If the plurality of items include a plurality of records from a database, the act may include any combination of retrieving, processing, displaying, modifying, or deleting the record from the database.

Examples of the input device include, but are not limited to, a pointing device, a keyboard, and a voice input device. Examples of pointing devices include, but are not limited to, a mouse, a touchpad, a trackball, a joystick, a pointing stick and a touchscreen. A selection of an item is detected in response to a user-initiated event for the item's associated region. Examples of the user-initiated event include, but are not limited to, an on-click event, a double-click event, a mouse-move event, a mouse-over event, a mouse-out event, a mouse-up event, and a key depression event.

Optionally, the method may further comprise outputting a signal to display a user-viewable advertisement. The signal to display the user-viewable advertisement may encode an image and/or graphics in the advertisement, or may provide a link to an image and/or graphics in the advertisement. The user-viewable advertisement may be viewable by the user while a visible depiction of the optimum ordering of the tree is being displayed. Here, for example, the user-viewable advertisement and the visible depiction may be contained within a single Web page.

An example is given to illustrate one embodiment of a method of organizing information. As should be appreciated, the scope of the present disclosure is not to be limited by this example. Other practical applications are contemplated based on the examples given in the patent applications having Ser. Nos. 09/243,595 and 09/533,545.

Figure 4:
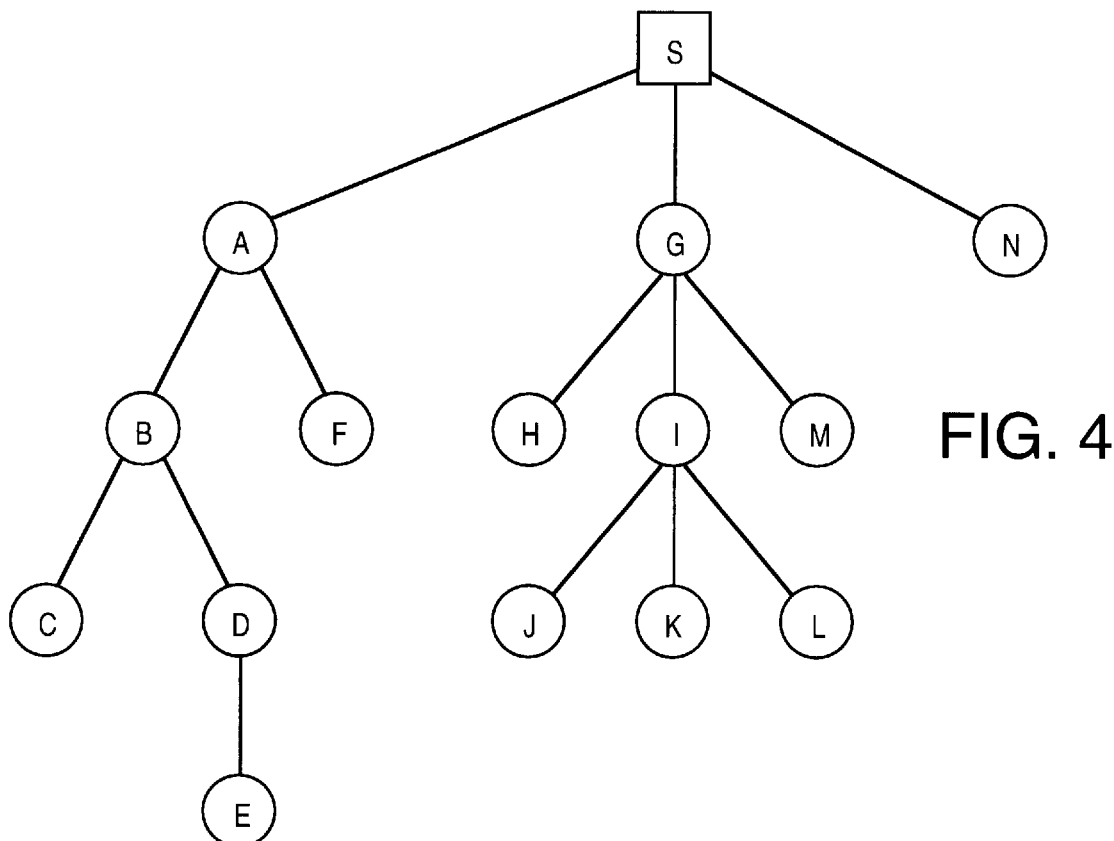
FIG. 4 schematically shows a tree which relates items in an example.

For purposes of illustration and example, consider a search engine generating fourteen items based on a search expression. FIG. 4 schematically shows a tree which relates the items. Each item is represented by a circle. The search expression is represented by a square. The search expression is the root node of the tree. Adjacent items in the tree are represented by a visible line segment between their corresponding regions.

For each of the items, TABLE I shows an initial sequence for considering its child items in a depth-first search of the tree. The initial sequence is used to provide an initial depth-first search sequence for considering items in the tree.

TABLE II illustrates one embodiment of determining a value associated with the initial depth-first search sequence. Each row in TABLE II represents an iteration associated with one of the items. From left to right, the columns in TABLE II indicate: (a) if at least one leaf item had been previously considered, (b) the current item being considered in the depth-first search sequence of the tree, (c) whether the current item is an internal item or a leaf item of the tree, (d) the level number of the current item, (e) a last-considered item associated with level number 1, (f) a last-considered item associated with level number 2, (g) a last-considered item associated with level number 3, (h) a last-considered item associated with level number 4, and (i) which similarity values are used to determine the value.

TABLE I

| Item | Sequence for considering child items |
|---|---|
| S | A G N |
| A | B F |
| B | C D |
| C | — |
| D | E |
| E | — |
| F | — |
| G | H I M |

TABLE I-continued

| Item | Sequence for considering child items |
|---|---|
| H | — |
| I | J K L |
| J | — |
| K | — |
| L | — |
| M | — |
| N | — |

As illustrated in TABLE II, fifteen similarity values are used to determine the value associated with the initial depth-first search sequence. The fifteen similarity values consist of a similarity value between items C and D, a similarity value between items C and E, a similarity value between items B and F, a similarity value between items D and F, a similarity value between items E and F, a similarity value between items A and G, a similarity value between items F and H, a similarity value between items H and I, a similarity value between items H and J, a similarity value between items J and K, a similarity value between items K and L, a similarity value between items I and M, a similarity value between items L and M, a similarity value between items G and N, and a similarity value between items M and N. In this example, the function used to determine the value associated with the initial depth-first search sequence is a sum of the fifteen similarity values.

TABLE II

| At least one leaf item previously considered? | Item | Internal or leaf? | Level | 1 | 2 | 3 | 4 | Similarity values used in function evaluation |
|---|---|---|---|---|---|---|---|---|
| No  | A | Internal | 1 | A | — | — | — | — |
| No  | B | Internal | 2 | A | B | — | — | — |
| No  | C | Leaf     | 3 | A | B | C | C | — |
| Yes | D | Internal | 3 | A | B | D | C | (C, D) |
| Yes | E | Leaf     | 4 | A | B | D | E | (C, E) |
| Yes | F | Leaf     | 2 | A | F | F | F | (B, F) (D, F) (E, F) |
| Yes | G | Internal | 1 | G | F | F | F | (A, G) |
| Yes | H | Leaf     | 2 | G | H | H | H | (F, H) |
| Yes | I | Internal | 2 | G | I | H | H | (H, I) |
| Yes | J | Leaf     | 3 | G | I | J | J | (H, J) |
| Yes | K | Leaf     | 3 | G | I | K | K | (J, K) |
| Yes | L | Leaf     | 3 | G | I | L | L | (K, L) |
| Yes | M | Leaf     | 2 | G | M | M | M | (I, M) (L, M) |
| Yes | N | Leaf     | 1 | N | N | N | N | (G, N) (M, N) |

TABLE III shows a modified sequence for considering child items of the search expression in a depth-first search of the tree. The modified sequence is used to provide a second depth-first search for considering items in the tree.

TABLE III

| Item | Sequence for considering child items |
|---|---|
| S | G A N |
| A | B F |
| B | C D |
| C | — |
| D | E |
| E | — |

TABLE III-continued

| Item | Sequence for considering child items |
|---|---|
| F | — |
| G | H I M |
| H | — |
| I | J K L |
| J | — |
| K | — |
| L | — |
| M | — |
| N | — |

TABLE IV illustrates one embodiment of determining a value associated with the second depth-first search sequence. As illustrated, sixteen similarity values are used to determine the value associated with the second depth-first search sequence. The sixteen similarity values consist of a similarity value between items H and I, a similarity value between items H and J, a similarity value between items J and K, a similarity value between items K and L, a similarity value between items I and M, a similarity value between items L and M, a similarity value between items A and G, a similarity value between items B and M, a similarity value between items C and M, a similarity value between items C and D, a similarity value between items C and E, a similarity value between items B and F, a similarity value between items D and F, a similarity value between items E and F, a similarity value between items A and N, and a similarity value between items F and N. In this example, the function used to determine the value associated with the second depth-first search sequence is a sum of the sixteen similarity values.

TABLE IV

| At least one leaf item previously considered? | Item | Internal or leaf? | Level | 1 | 2 | 3 | 4 | Similarity values used in function evaluation |
|---|---|---|---|---|---|---|---|---|
| No  | G | Internal | 1 | G | — | — | — | — |
| No  | H | Leaf     | 2 | G | H | H | H | — |
| Yes | I | Internal | 2 | G | I | H | H | (H, I) |
| Yes | J | Leaf     | 3 | G | I | J | J | (H, J) |
| Yes | K | Leaf     | 3 | G | I | K | K | (J, K) |
| Yes | L | Leaf     | 3 | G | I | L | L | (K, L) |
| Yes | M | Leaf     | 2 | G | M | M | M | (I, M) (L, M) |
| Yes | A | Internal | 1 | A | M | M | M | (A, G) |
| Yes | B | Internal | 2 | A | B | M | M | (B, M) |
| Yes | C | Leaf     | 3 | A | B | C | C | (C, M) |
| Yes | D | Internal | 3 | A | B | D | C | (C, D) |
| Yes | E | Leaf     | 4 | A | B | D | E | (C, E) |
| Yes | F | Leaf     | 2 | A | F | F | F | (B, F) (D, F) (E, F) |
| Yes | N | Leaf     | 1 | N | N | N | N | (A, N) (F, N) |

The above process is repeated for additional depth-first search sequences by modifying a sequence for considering child items for at least one item. Potential sequences for considering child items of item S are A-G-N, A-N-G, G-A-N, G-N-A, N-A-G and N-G-A. Potential sequences for considering child items of item A are B-F and F-B. Potential sequences for considering child items of item B are C-D and D-C. Item D has one potential sequence for considering its child, namely item E. Potential sequences for considering child items of item G are H-I-M, H-M-I, I-H-M, I-M-H, M-H-I and M-I-H. Potential sequences for considering child items of item I are J-K-L, J-L-K, K-J-L, K-L-J, L-J-K and L-K-J.

Values associated with all possible depth-first search sequences of the tree may be determined. The number of possible depth-first search sequences of the tree is equal to the product of 3!, 2!, 2!, 1!, 3! and 3!, which equals 864.

Preferably, values associated with at most half of all possible depth-first search sequences of the tree (432 in this example) are determined. In this case, the depth-first search sequences which are considered are limited by prohibiting reverse-equivalent sequences for considering child items of the root item, namely the item S. In this example, the sequences for considering child items of the item S may be limited to A-G-N, A-N-G and G-A-N (whose reverse-equivalent sequences are N-G-A, G-N-A and N-A-G, respectively).

Based on the values, the depth-first search sequence having a maximum value associated therewith is determined. For purposes of illustration and example, consider that the value associated with the second depth-first search sequence is greater than or equal to values associated with the other depth-first search sequences.

Figure 5:
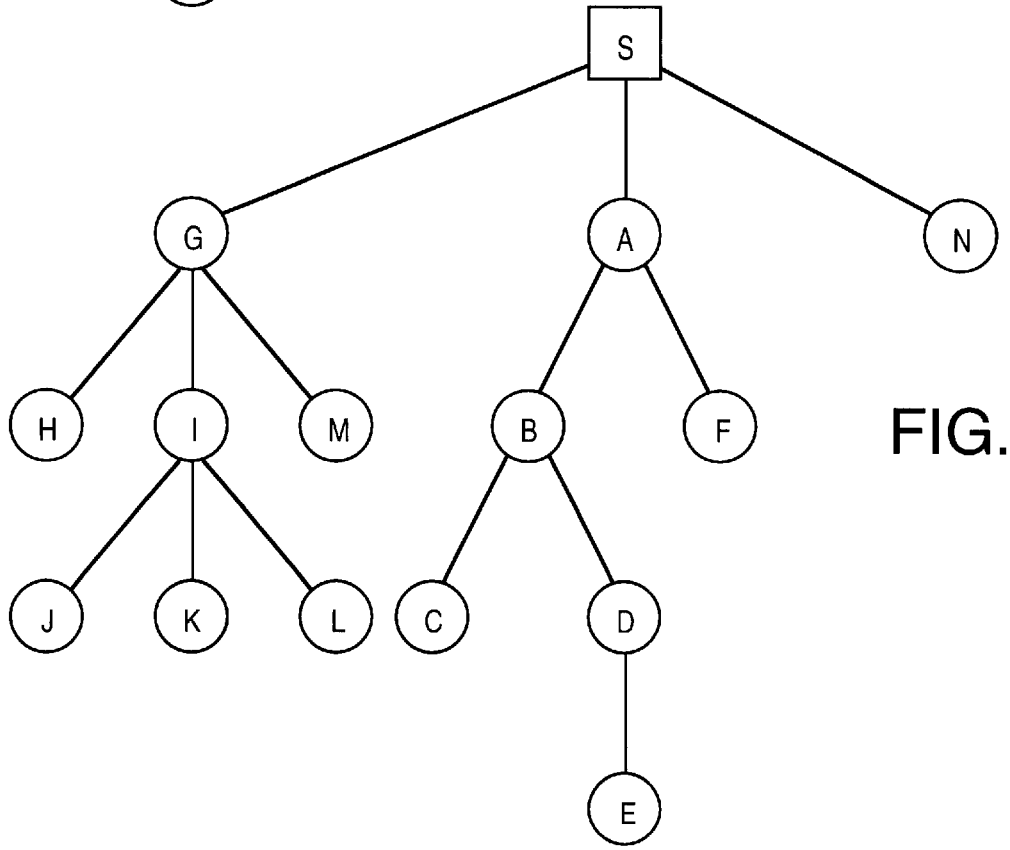
FIG. 5 shows one example of a planar depiction of an optimum ordering of the items in the tree.

A signal may be outputted to display a planar depiction of the tree in which the items are ordered according to the second depth-first search sequence. FIG. 5 shows one example of a planar depiction of the tree having the aforementioned ordering of the items. The planar depiction comprises a plurality of regions to visibly represent the items, wherein adjacent items in the tree are represented by a visible line segment between their corresponding regions. Child items are ordered from left-to-right according to the sequence associated with the second depth-first search sequence.

Figure 6:
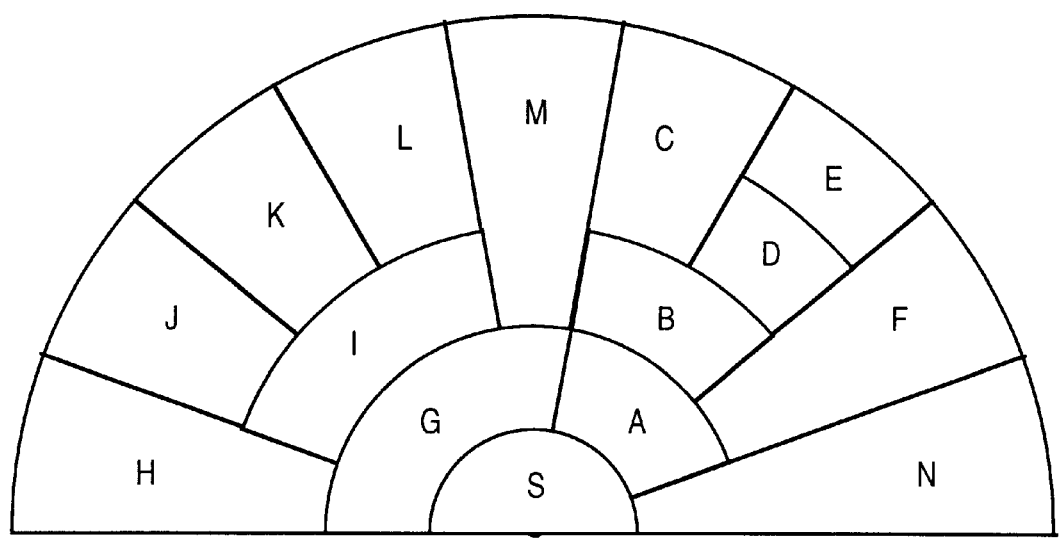
FIG. 6 shows another example of a depiction of the optimum ordering of the items in the tree.

FIG. 6 shows an alternative depiction of the tree having the aforementioned ordering of the items. In this depiction, the items are visibly represented by a plurality of regions. Adjacent items in the tree are represented by radially-adjacent regions. Pairs of items indicated in the rightmost column of TABLE IV are represented by angularly-adjacent regions.

A browsing sequence may be provided in accordance with the second depth-first search sequence. In this case, the sequence for browsing the items is G-H-I-J-K-L-M-A-B-C-D-E-F-N (see the second column of TABLE IV). The browsing sequence and the tree may be used in accordance with the teachings in the patent application having Ser. No. 09/533,545, which is incorporated by reference into the present disclosure.

In the above example, cyclic-equivalent and reverse cyclic-equivalent sequences may be prohibited by prohibiting cyclic-equivalent and reverse cyclic-equivalent sequences for considering child items of the root item, namely the item S. Thus, the sequence for considering child items of the item S may be limited to A-G-N, since G-N-A and N-A-G are cyclic-equivalent sequences, and N-G-A, A-N-G and G-A-N are reverse cyclic-equivalent sequences. In this case, the items from the first non-root item to the first leaf item may be considered twice to determine a value associated with a depth-first search sequence of the tree. In the above example, the value associated with initial depth-first search sequence would be further based upon a similarity value between items A and N, a similarity value between items B and N, and a similarity value between items C and N. The value associated with the second depth-first search sequence would be further based upon a similarity value between items G and N, and a similarity value between items H and N. However, as explained above, the second depth-first search sequence would not have been considered.

An apparatus for performing embodiments of the herein-disclosed method may comprise one or more programmed computers. Each programmed computer may provide a particular functionality implemented using hardware and/or software and/or firmware.

Preferably, a programmed computer includes a computer memory encoded with executable instructions representing a computer program. A processor is responsive to the computer memory to perform a series of specifically identified operations dictated by the computer program. In this way, the computer program can cause the computer to act in a particular fashion.

Examples of the processor include, but are not limited to, a general purpose microprocessor, an application-specific integrated circuit (which may be either standard or custom), one or more discrete logic elements, a digital signal processor, one or more circuits, or any combination thereof. It is noted that the processor may be embodied by either a single processing unit or a plurality of processing units. For example, the processor may be embodied by either a single, central processing unit or a plurality of distributed processing units.

Examples of the computer memory include, but are not limited to, an electronic memory, a magnetic memory, an optical memory, and a magneto-optical memory. Examples of an electronic memory include, but are not limited to, a programmable electronic memory and a read-only, hard-wired electronic memory. Examples of a magnetic memory include, but are not limited to, a magnetic disk and a magnetic tape. The magnetic disk may be embodied by a magnetic floppy diskette or a magnetic hard drive, for example. Examples of an optical memory include, but are not limited to, an optical disk. The optical disk may be embodied by a compact disk or a DVD, for example. Regardless of its form, the computer memory may be either read-only, once-writable, or rewritable.

In general, the processor may be responsive to any data structures, computer programs, and signals encoded on a computer-readable medium to perform an embodiment of any of the herein-disclosed methods and examples. Examples of the computer-readable medium include, but are not limited to, computer-readable storage media and computer-readable communication media. Examples of computer-readable storage media are described with reference to the computer memory. Examples of computer-readable communication media include, but are not limited to, an optical medium, an electronic medium, and an electromagnetic medium.

The computer is coupled to a display to display a planar depiction described herein, computer-readable items represented by the planar depiction, and other visible information to an end user. Examples of the display include any of the herein-disclosed display devices.

The computer receives user-initiated selections and other user input from one or more user input devices. Examples of the one or more user input devices include any of the herein-disclosed input devices. The computer processes the user input and/or communicates at least one signal based upon the user input. The display and the one or more user input devices facilitate user interaction with the computer.

The computer includes a transceiver to communicate with a computer network. Examples of the transceiver include, but are not limited to, a modem, a network interface, and a wireless transceiver.

Embodiments of the herein-disclosed methods and examples can be performed using either a single computer or a plurality of computers. A plurality of computers may cooperate in a client-server fashion, for example.

It is noted that the present disclosure contemplates methods, articles, apparatus, and examples which include an act of providing a link to a computer site which performs an embodiment of any of the herein-disclosed methods and examples. The present disclosure also contemplates methods, articles, apparatus, and examples which include an act of providing a user-viewable advertisement for a computer site which assists in performing an embodiment of any of the herein-disclosed methods and examples. The user-viewable advertisement may be communicated to the end user from either an advertisement provider or the computer site. The present disclosure further contemplates methods, articles, apparatus, and examples which include an act of receiving a hit from an end user who has hyperlinked from a computer site which performs an embodiment of any of the herein-disclosed methods and examples. Each of the aforementioned computer sites may include an internet site, a Web site, or another site accessible via a computer network.

It will be apparent to those skilled in the art that the disclosed inventions may be modified in numerous ways and may assume many embodiments other than the preferred forms specifically set out and described herein. For example, the acts described with reference to FIGS. 1 to 3 may be executed in an order other than that indicated by FIGS. 1 to 3. Further, some of the acts may be performed in parallel.

Accordingly, it is intended by the appended claims to cover all modifications which fall within the true spirit and scope of the present invention.

What is claimed is:

1. A method comprising:
    (a) providing a tree which relates a plurality of items, the items consisting of a plurality of internal items and a plurality of leaf items;
    (b) providing a depth-first search sequence for considering items in the tree;
    (c) providing a memory which is to indicate, for each level number from one to a height of the tree, a last-considered item associated with the level number;
    (d) considering a current item in the depth-first search sequence of the tree;
    (e) using a similarity value between the current item and the last-considered item associated with a level number of the current item to determine a value associated with the depth-first search sequence if at least one of the leaf items had been previously considered in the depth-first search sequence and the current item is one of the internal items;
    (f) using each similarity value between the current item and each unique last-considered item associated with level numbers from the level number of the current item to the height of tree to determine the value associated with the depth-first search sequence if at least one of the leaf items had been previously considered in the depth-first search sequence and the current item is one of the leaf items;
    (g) indicating the current item as the last considered item associated with the level number of the current item if the current item is one of the internal items;
    (h) indicating the current item as the last considered item associated with each level number from the level number of the current item to the height of tree if the current item is one of the leaf items;
    (i) repeating (d) to (h) for at least one subsequent item in the depth-first search sequence;
    (j) modifying the depth-first search sequence for considering the items in the tree and repeating (d) to (i); and
    (k) determining which depth-first search sequence has an optimum value associated therewith.

2. The method of claim 1 wherein (b) comprises, for each of the internal items having at least two child items in the tree, initializing a respective sequence for considering its respective child items in the depth-first search sequence of the tree, and wherein (j) comprises, for at least one of the internal items having at least two child items in the tree, modifying the respective sequence for considering its respective child items to modify the depth-first search sequence.

3. The method of claim 1 wherein (i) comprises repeating (d) to (f) for each subsequent item in the depth-first search sequence.

4. The method of claim 1 further comprising repeating (j) to determine a plurality of values associated with at least half of all possible depth-first search sequences of the tree.

5. The method of claim 1 wherein the value associated with the depth-first search sequence is based on a sum of a plurality of similarity values identified in (e) and (f) for the depth-first search sequence.

6. The method of claim 1 wherein the value associated with the depth-first search sequence is based on an average of a plurality of similarity values identified in (e) and (f) for the depth-first search sequence.

7. The method of claim 1 wherein the value associated with the depth-first search sequence is based on a product of a plurality of similarity values identified in (e) and (f) for the depth-first search sequence.

8. The method of claim 1 further comprising:
    (l) outputting a signal to display a planar depiction of the tree in which the items are ordered according to the depth-first search sequence having the optimum value.

9. The method of claim 1 further comprising:
    (l) outputting a signal to display a plurality of regions to visibly represent the items, wherein adjacent items in the tree are represented by radially-adjacent regions, and wherein pairs of items identified in (e) and (f) for the depth-first search sequence having the optimum value are represented by angularly-adjacent regions.

10. The method of claim 1 further comprising:
    (l) outputting a signal to provide a plurality of user-selectable regions associated with the items, wherein adjacent items in the tree are represented by radially-adjacent user-selectable regions, and wherein pairs of items identified in (e) and (f) for the depth-first search sequence having the optimum value are represented by angularly-adjacent user-selectable regions.

11. The method of claim 1 wherein the items comprise a search expression and results of a search based on the search expression.

12. The method of claim 1 wherein the items comprise a plurality of computer-readable items.

13. The method of claim 1 further comprising:
    (l) providing a browsing sequence for the items based on the depth-first search sequence having the optimum value associated therewith.

14. A computer-readable medium whose contents cause a computer system to:
    (a) provide a tree which relates a plurality of items, the items consisting of a plurality of internal items and a plurality of leaf items;
    (b) provide a depth-first search sequence for considering items in the tree;

(c) provide a plurality of variables in a memory which is to indicate, for each level number from one to a height of the tree, a last-considered item associated with the level number;

(d) consider a current item in the depth-first search sequence of the tree;

(e) use a similarity value between the current item and the last-considered item associated with a level number of the current item to determine a value associated with the depth-first search sequence if at least one of the leaf items had been previously considered in the depth-first search sequence and the current item is one of the internal items;

(f) use each similarity value between the current item and each unique last-considered item associated with level numbers from the level number of the current item to the height of tree to determine the value associated with the depth-first search sequence if at least one of the leaf items had been previously considered in the depth-first search sequence and the current item is one of the leaf items;

(g) indicate the current item as the last considered item associated with the level number of the current item if the current item is one of the internal items;

(h) indicate the current item as the last considered item associated with each level number from the level number of the current item to the height of tree if the current item is one of the leaf items;

(i) repeat (d) to (h) for at least one subsequent item in the depth-first search sequence;

(j) modify the depth-first search sequence for considering the items in the tree and repeat (d) to (i); and (k) determine which depth-first search sequence has an optimum value associated therewith.

15. The computer-readable medium of claim 14 wherein (b) comprises, for each of the internal items having at least two child items in the tree, initializing a respective sequence for considering its respective child items in the depth-first search sequence of the tree, and wherein (j) comprises, for at least one of the internal items having at least two child items in the tree, modifying the respective sequence for considering its respective child items to modify the depth-first search sequence.

16. The computer-readable medium of claim 14 wherein (i) comprises repeating (d) to (f) for each subsequent item in the depth-first search sequence.

17. The computer-readable medium of claim 14 wherein the contents further cause the computer system to repeat (j) to determine a plurality of values associated with at least half of all possible depth-first search sequences of the tree.

18. The computer-readable medium of claim 14 wherein the value associated with the depth-first search sequence is based on a sum of a plurality of similarity values identified in (e) and (f) for the depth-first search sequence.

19. The computer-readable medium of claim 14 wherein the value associated with the depth-first search sequence is based on an average of a plurality of similarity values identified in (e) and (f) for the depth-first search sequence.

20. The computer-readable medium of claim 14 wherein the value associated with the depth-first search sequence is based on a product of a plurality of similarity values identified in (e) and (f) for the depth-first search sequence.

21. The computer-readable medium of claim 14 wherein the contents further cause the computer system to:

(l) output a signal to display a planar depiction of the tree in which the items are ordered according to the depth-first search sequence having the optimum value.

22. The computer-readable medium of claim 14 wherein the contents further cause the computer system to:

(l) output a signal to display a plurality of regions to visibly represent the items, wherein adjacent items in the tree are represented by radially-adjacent regions, and wherein pairs of items identified in (e) and (f) for the depth-first search sequence having the optimum value are represented by angularly-adjacent regions.

23. The computer-readable medium of claim 14 wherein the contents further cause the computer system to:

(l) output a signal to provide a plurality of user-selectable regions associated with the items, wherein adjacent items in the tree are represented by radially-adjacent user-selectable regions, and wherein pairs of items identified in (e) and (f) for the depth-first search sequence having the optimum value are represented by angularly-adjacent user-selectable regions.

24. The computer-readable medium of claim 14 wherein the items comprise a search expression and results of a search based on the search expression.

25. The computer-readable medium of claim 14 wherein the items comprise a plurality of computer-readable items.

26. The computer-readable medium of claim 14 wherein the contents further cause the computer system to:

(l) provide a browsing sequence for the items based on the depth-first search sequence having the optimum value associated therewith.

27. An apparatus comprising:

a computer system programmed to:

(a) provide a tree which relates a plurality of items, the items consisting of a plurality of internal items and a plurality of leaf items;

(b) provide a depth-first search sequence for considering items in the tree;

(c) provide a memory which is to indicate, for each level number from one to a height of the tree, a last-considered item associated with the level number;

(d) consider a current item in the depth-first search sequence of the tree;

(e) use a similarity value between the current item and the last-considered item associated with a level number of the current item to determine a value associated with the depth-first search sequence if at least one of the leaf items had been previously considered in the depth-first search sequence and the current item is one of the internal items;

(f) use each similarity value between the current item and each unique last-considered item associated with level numbers from the level number of the current item to the height of tree to determine the value associated with the depth-first search sequence if at least one of the leaf items had been previously considered in the depth-first search sequence and the current item is one of the leaf items;

(g) indicate the current item as the last considered item associated with the level number of the current item if the current item is one of the internal items;

(h) indicate the current item as the last considered item associated with each level number from the level number of the current item to the height of tree if the current item is one of the leaf items;

(i) repeat (d) to (h) for at least one subsequent item in the depth-first search sequence;

(j) modify the depth-first search sequence for considering the items in the tree and repeat (d) to (i); and (k) determine which depth-first search sequence has an optimum value associated therewith.

28. The apparatus of claim 27 wherein (b) comprises, for each of the internal items having at least two child items in the tree, initializing a respective sequence for considering its respective child items in the depth-first search sequence of the tree, and wherein (j) comprises, for at least one of the internal items having at least two child items in the tree, modifying the respective sequence for considering its respective child items to modify the depth-first search sequence.

29. The apparatus of claim 27 wherein (i) comprises repeating (d) to (f) for each subsequent item in the depth-first search sequence.

30. The apparatus of claim 27 wherein the computer system is further programmed to repeat (j) to determine a plurality of values associated with at least half of all possible depth-first search sequences of the tree.

31. The apparatus of claim 27 wherein the value associated with the depth-first search sequence is based on a sum of a plurality of similarity values identified in (e) and (f) for the depth-first search sequence.

32. The apparatus of claim 27 wherein the value associated with the depth-first search sequence is based on an average of a plurality of similarity values identified in (e) and (f) for the depth-first search sequence.

33. The apparatus of claim 27 wherein the value associated with the depth-first search sequence is based on a product of a plurality of similarity values identified in (e) and (f) for the depth-first search sequence.

34. The apparatus of claim 27 wherein the computer system is further programmed to:

(l) output a signal to display a planar depiction of the tree in which the items are ordered according to the depth-first search sequence having the optimum value.

35. The apparatus of claim 27 wherein the computer system is further programmed to:

(l) output a signal to display a plurality of regions to visibly represent the items, wherein adjacent items in the tree are represented by radially-adjacent regions, and wherein pairs of items identified in (e) and (f) for the depth-first search sequence having the optimum value are represented by angularly-adjacent regions.

36. The apparatus of claim 27 wherein the computer system is further programmed to:

(l) output a signal to provide a plurality of user-selectable regions associated with the items, wherein adjacent items in the tree are represented by radially-adjacent user-selectable regions, and wherein pairs of items identified in (e) and (f) for the depth-first search sequence having the optimum value are represented by angularly-adjacent user-selectable regions.

37. The apparatus of claim 27 wherein the items comprise a search expression and results of a search based on the search expression.

38. The apparatus of claim 27 wherein the items comprise a plurality of computer-readable items.

39. The apparatus of claim 27 wherein the computer system is further programmed to:

(l) provide a browsing sequence for the items based on the depth-first search sequence having the optimum value associated therewith.

* * * * *